(12) United States Patent
Yang

(10) Patent No.: US 11,147,074 B2
(45) Date of Patent: Oct. 12, 2021

(54) DATA TRANSMISSION METHOD AND APPARATUS

(71) Applicant: Guangdong OPPO Mobile Telecommunications Corp., Ltd., Guangdong (CN)

(72) Inventor: Ning Yang, Guangdong (CN)

(73) Assignees: GUANGDONG OPPO MOBILE, Dongguan (CN); TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/461,993

(22) PCT Filed: Nov. 25, 2016

(86) PCT No.: PCT/CN2016/107229
§ 371 (c)(1),
(2) Date: May 17, 2019

(87) PCT Pub. No.: WO2018/094684
PCT Pub. Date: May 31, 2018

(65) Prior Publication Data
US 2019/0327747 A1 Oct. 24, 2019

(51) Int. Cl.
*H04W 72/08* (2009.01)
*H04W 28/02* (2009.01)
(Continued)

(52) U.S. Cl.
CPC ....... *H04W 72/08* (2013.01); *H04W 28/0268* (2013.01); *H04W 28/0289* (2013.01);
(Continued)

(58) Field of Classification Search
CPC ... H04W 72/00; H04W 72/02; H04W 72/042; H04W 72/048; H04W 72/0493;
(Continued)

(56) References Cited

U.S. PATENT DOCUMENTS

| 8,818,392 | B2 * | 8/2014 | Chetlur | H04W 72/1252 |
| | | | | 455/453 |
| 2005/0239465 | A1 * | 10/2005 | Lee | H04W 36/26 |
| | | | | 455/436 |

(Continued)

FOREIGN PATENT DOCUMENTS

| CA | 2456372 | * | 1/2004 | H04L 29/06 |
| CN | 104754748 A | | 7/2015 | |

(Continued)

OTHER PUBLICATIONS

Huawei et al: "Support of Qos for PC5-based V2V transport", 3GPP TSG-RAN WG2 Meeting #94; R2-163811 Nanjing, China, May 23-27, 2016, XP051105217.

(Continued)

*Primary Examiner* — Warner Wong
(74) *Attorney, Agent, or Firm* — Young Basile Hanlon & MacFarlane, P.C.

(57) ABSTRACT

A method and device for data transmission are provided. The method includes: acquiring, by a terminal device, target resource configuration information, wherein the target resource configuration information corresponds to target service related information determined by the terminal device; and sending, by the terminal device, according to the target resource configuration information, a data packet to be sent that carries the target service.

12 Claims, 2 Drawing Sheets

(51) Int. Cl.
  *H04W 48/16* (2009.01)
  *H04W 72/02* (2009.01)
  *H04W 72/04* (2009.01)
(52) U.S. Cl.
  CPC ............ *H04W 48/16* (2013.01); *H04W 72/02* (2013.01); *H04W 72/042* (2013.01); *H04W 72/048* (2013.01); *H04W 72/0493* (2013.01)
(58) Field of Classification Search
  CPC . H04W 72/08; H04W 28/00; H04W 28/0268; H04W 28/0289; H04W 28/0967; H04W 48/16; H04W 48/18; H04L 4/08; H04L 4/0803; H04L 4/0806; H04L 4/0813; H04L 65/1069; H04L 65/0247; H04L 65/0231
  See application file for complete search history.

(56) References Cited

U.S. PATENT DOCUMENTS

| | | | | |
|---|---|---|---|---|
| 2008/0095102 | A1* | 4/2008 | Meng | H04W 74/08 370/329 |
| 2011/0149879 | A1* | 6/2011 | Noriega | H04W 72/1236 370/329 |
| 2011/0312331 | A1 | 12/2011 | Hakola et al. | |
| 2013/0040678 | A1* | 2/2013 | Lee | H04W 72/1252 455/509 |
| 2013/0336301 | A1* | 12/2013 | Deng | H04W 72/1289 370/336 |
| 2014/0269541 | A1* | 9/2014 | Khude | H04W 72/042 370/329 |
| 2016/0302166 | A1* | 10/2016 | Dang | H04L 65/4076 |
| 2016/0323869 | A1 | 11/2016 | Xu et al. | |
| 2018/0343665 | A1* | 11/2018 | Yan | H04W 72/12 |
| 2019/0223044 | A1* | 7/2019 | Qin | H04W 24/10 |
| 2019/0327747 | A1* | 10/2019 | Yang | H04W 72/048 |

FOREIGN PATENT DOCUMENTS

| | | | |
|---|---|---|---|
| CN | 106162513 | A | 11/2016 |
| EP | 3220714 | A1 | 9/2017 |
| JP | H1117607 | A | 1/1999 |
| JP | H11275655 | A | 10/1999 |
| JP | 201696475 | A | 5/2016 |
| JP | 2017515431 | A | 6/2017 |
| JP | 2017522786 | A | 8/2017 |
| TW | 201543935 | A | 11/2015 |
| WO | 2015028357 | A1 | 3/2015 |
| WO | 2015116865 | A1 | 8/2015 |
| WO | 2015143170 | A1 | 9/2015 |
| WO | 2015192726 | A1 | 12/2015 |
| WO | 2016024890 | A1 | 2/2016 |
| WO | WO-2017193622 | A1 * | 11/2017 ............. H04W 8/24 |
| WO | WO-2018120663 | A1 * | 7/2018 ............ H04W 72/04 |

OTHER PUBLICATIONS

Extended European search report issued in corresponding European application No. 16922094.4 dated Sep. 30, 2019.
English Translation of First Chinese Office Action dated Apr. 23, 2020 from Application No. 201680089528.8.
Examination report issued in corresponding IN application No. 201917023570 dated Aug. 5, 2020.
Second Chinese office action and english translation issued in corresponding CN application No. 201680089528.8 dated Aug. 27, 2020.
3GPP TSG-RAN WG2 Meeting #96; R2-167887; Reno, USA, Nov. 14-18, 2016.
3GPP TSG-RAN WG2 Meeting #96; R2-167936; Reno, USA, Nov. 14-18, 2016.
Communication pursuant to Article 94(3) EPC Examination for EP Application 16922.94.4 dated Jan. 21, 2021.
China Decision on Refusal with English Translation for CN Application 201680089528.8 dated Jan. 5, 2021.
Japan First Office Action with English Translation for JP Application 2019526474 dated Nov. 24, 2020.
Taiwan First Office Action with English Translation for TW Application 106138128 dated Feb. 26, 2021. (16 pages).
China Decision on Reexamination with English Translation for CN Application 201680089528.8 dated Aug. 27, 2021. (23 pages).
Japan Office Action with English Translation for JP Application 2019-526474 dated Jun. 15, 2021. (10 pages).

* cited by examiner

100

| A terminal device acquires target resource configuration information, wherein the target resource configuration information corresponds to target service related information determined by the terminal device. | ∽ S110 |

| The terminal device sends, according to the target resource configuration information, a data packet to be sent that carries the target service. | ∽ S120 |

| A terminal device determines to work in at least one of the following states: a state of being in a communication mode with a direct interface and controlled by the terminal device, a state of being not connected with a network, and a state of being not within a network coverage. | ∽ S130 |

| The terminal device acquires target resource configuration information, wherein the target resource configuration information corresponds to target service related information determined by the terminal device. | ∽ S110 |

| The terminal device sends, according to the target resource configuration information, a data packet to be sent that carries the target service. | ∽ S120 |

FIG. 2

DATA TRANSMISSION METHOD AND APPARATUS

CROSS-REFERENCE TO RELATED APPLICATION(S)

This application is a 371 application of International Application No. PCT/CN2016/107229, filed on Nov. 25, 2016, the entire disclosure of which is hereby incorporated by reference.

TECHNICAL FIELD

Implementations of the present disclosure relate to the communication field, and in particular, to a method and device for data transmission.

BACKGROUND

With the development of a cellular network system, the application field of the cellular network system is gradually expanded from traditional person-to-person communication to vehicle-to-person and vehicle-to-vehicle communication. Through vehicle-to-person communication, the efficiency of traffic communication can be effectively improved, traffic accidents can be avoided, and the risk of driving can be reduced. In the process of vehicle-to-person and vehicle-to-vehicle communication, a vehicle need to communicate via a direct (Sidelink) interface between vehicles and/or an air (Uu) interface between the vehicle and a network, so as to ensure proper information interchange between vehicles.

In processes of vehicle-to-person communication and vehicle-to-vehicle communication, it is needed to provide a method for data transmission to solve a congestion problem in the data transmission process.

SUMMARY

The application provides a method and device for data transmission.

In a first aspect, a method for data transmission is provided. The method includes: acquiring, by a terminal device, target resource configuration information, wherein the target resource configuration information corresponds to target service related information determined by the terminal device; and sending, by the terminal device, according to the target resource configuration information, a data packet to be sent that carries the target service.

According to the method for data transmission of the application, the terminal device sends the data packet according to the target resource configuration information acquired by itself.

In combination with a first aspect, in an implementation of the first aspect, acquiring, by the terminal device, the target resource configuration information, includes: determining, by the terminal device, the target resource configuration information according to a preset correspondence relationship, wherein the preset correspondence relationship includes a correspondence relationship between service related information and resource configuration information.

In combination with the first aspect and the foregoing implementation, in another implementation of the first aspect, before the terminal device acquires the target resource configuration information according to the preset correspondence relationship, the method further includes: determining, by the terminal device, to work in at least one of the following states: a state of being in a communication mode with a direct interface and controlled by the terminal device, a state of being not connected with a network, and a state of being not within a network coverage.

In combination with the first aspect and the foregoing implementations, in another implementation of the first aspect, before the terminal device acquires the target resource configuration information according to the preset correspondence relationship, the method further includes: determining, by the terminal device, that a transmitting resource pool is in a congestion state.

In combination with the first aspect and the foregoing implementations, in another implementation of the first aspect, the target resource configuration information includes at least one of the following information: a logical channel used for sending the data packet, a probability of reserving resources for sending the data packet, a probability of sending the data packet, a time delay of using reserved resources for sending the data packet, and a time delay of sending the data packet.

In combination with the first aspect and the foregoing implementations, in another implementation of the first aspect, the target service related information includes a parameter related to a quality of service (QoS) of the data packet to be sent.

In combination with the first aspect and the foregoing implementations, in another implementation of the first aspect, the parameter related to the quality of service (QoS) of the data packet to be sent includes at least one of the following parameters: a ProSe Per-Packet Priority (PPPP) of the data packet to be sent, a QoS Class Identifier (QCI) of the data packet to be sent, and a logical channel number corresponding to the data packet to be sent.

In combination with the first aspect and the foregoing implementations, in another implementation of the first aspect, the method further includes: receiving, by the terminal device, configuration information sent by a network device, wherein the configuration information includes the preset correspondence relationship.

In a second aspect, a terminal device is provided. The terminal device is used for executing the method in the first aspect or any possible implementation of the first aspect. Specifically, the terminal device includes function modules used for executing the method in the first aspect or any possible implementation of the first aspect.

In a third aspect, a terminal device is provided. The terminal device includes a processor, a memory, and a transceiver. The processor, the memory and the transceiver are connected through a bus system. The memory is used for storing instructions. The transceiver sends and receives information based on the control of the processor. The processor is used for calling the instructions stored in the memory to execute the method in the first aspect or any possible implementation of the first aspect.

In a fourth aspect, a computer readable medium is provided for storing a computer program. The computer program includes instructions used for executing the method in the first aspect or any possible implementation of the first aspect.

BRIEF DESCRIPTION OF DRAWINGS

FIG. 1 is a schematic flowchart of a method for data transmission according to an implementation of the present disclosure;

FIG. 2 is another schematic flowchart of a method for data transmission according to an implementation of the present disclosure;

DETAILED DESCRIPTION

Figure 3:
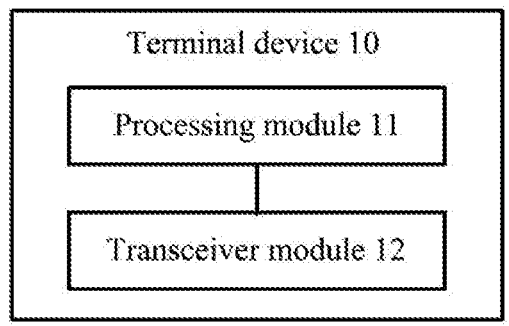
FIG. 3 is a schematic diagram of a terminal device according to an implementation of the present disclosure.

The technical solutions in implementations of the present disclosure are described in the following clearly and completely with reference to the accompanying drawings in the implementations of the present disclosure.

In implementations of the present disclosure, terminal devices may include, but not limited to, a Mobile Station (MS), a mobile terminal, a mobile phone, User Equipment (UE), a handset, portable equipment, a vehicle, and so on. A terminal device may communicate with one or more core networks through a radio access network (RAN). For example, the terminal device may be a mobile phone (or referred to as a "cellular" phone), or a computer having a radio communication function. Optionally, the terminal device may be a portable, pocket-sized, handheld, computer built-in, or vehicle mounted mobile apparatus.

It should also be understood that, in implementations of the present application, a network device may be a base station. The base station may be a Base Transceiver Station (BTS) of a Global System of Mobile communication (GSM) or a Code Division Multiple Access (CDMA) system, or a base station (NodeB) in a Wideband Code Division Multiple Access (WCDMA) system, or an evolutional Node B (eNB or e-NodeB) in a Long Term Evolution (LTE) system, which is not restricted in the present application. Optionally, the network device may be a Road Side Unit (RSU) capable of scheduling a vehicle terminal. Optionally, the RSU may be an RSU of a base station type, or an RSU of a terminal type. The specific form may be an intelligent traffic light, a traffic billboard, or other devices, which is not restricted in implementations of the present disclosure.

Implementations of the present disclosure may be applied in various communication systems, such as communication systems of V2V, V2X, and Device to Device (D2D), which is not specifically restricted by implementations of the present disclosure. Taking a V2X communication system as an example, generally, there are three communication modes for the V2X communication system: a communication mode with a Uu interface, a communication mode with a direct interface and controlled by a network device, and a communication mode with a direct interface and controlled (or selected) by a terminal device.

Specifically, a communication mode with a Uu interface is also known as a communication mode with an air interface. In this communication mode, a terminal device may establish, reconfigure, and release various radio bearer services with a network device (such as a base station). A communication mode with a direct interface and controlled by a network device may refer to direct communication between a terminal device and a terminal device, and in this communication mode, communication resources between the terminal device and the terminal device may be allocated by the network device. A communication mode with a direct interface and controlled by a terminal device may refer to direct communication between terminal devices, and in this communication mode, communication resources between the terminal devices may be allocated by the terminal device.

In order to make a terminal device be capable of controlling congestion by itself in a communication mode with a direct interface and controlled by the terminal device, an implementation of the present disclosure introduces a new method for data transmission, which is described in detail below with reference to FIG. 1.

FIG. 1 illustrates a method for data transmission according to an implementation of the present disclosure. As illustrated in FIG. 1, the method 100 includes acts S110 and S120.

In S110, a terminal device acquires target resource configuration information, wherein the target resource configuration information corresponds to target service related information determined by the terminal device.

In S120, the terminal device sends, according to the target resource configuration information, a data packet to be sent that carries the target service.

Optionally, the target service related information includes a parameter related to a Quality of Service (QoS) of the data packet to be sent. For example, the parameter related to the QoS may include at least one of the following parameters: a ProSe Per-Packet Priority (PPPP) of the data packet to be sent, a QoS Class Identifier (QCI) of the data packet to be sent, and a logical channel number corresponding to the data packet to be sent.

Optionally, the terminal device checks the data packet to be sent, and the terminal device may determine the target service related information corresponding to the data packet according to the type of service corresponding to the data packet. For example, when the service corresponding to the data packet is a voice service, the QCI value of the data packet is 1; when the service corresponding to the data packet is a video service, the QCI value of the data packet is 2; when the service corresponding to the data packet is an interactive game service, the QCI value of the data packet is 3. Alternatively, when the service corresponding to the data packet is a voice service, the PPPP of the data packet is a high priority; when the service corresponding to the data packet is a video service, the PPPP of the data packet is a medium priority; when the service corresponding to the data packet is an interactive game service, the PPPP of the data packet is a low priority.

Optionally, acquiring the target resource configuration information described above refers to that the terminal device acquires the target resource configuration information from configuration information sent by a network device to the terminal device, or acquiring the target resource configuration information described above refers to that the terminal device acquires the target resource configuration information from configuration information pre-configured for the terminal device.

Optionally, the terminal device acquires the target resource configuration information according to a preset correspondence relationship, wherein the preset correspondence relationship includes a correspondence relationship between service related information and resource configuration information. The preset correspondence relationship is configured by the network device or pre-configured by the terminal device. When the preset correspondence relationship is configured by the network device, the terminal device receives configuration information sent by the network device, the configuration information including the preset correspondence relationship. Therefore, the terminal device sends data packets according to a preset rule, which can alleviate congestion during the process of sending the data.

As an example, the target resource configuration information includes at least one of the following information: a logical channel used for sending the data packet, a probability of reserving resources for sending the data packet, a probability of sending the data packet, a time delay of using reserved resources for sending the data packet, and a time delay of sending the data packet.

As an example, the aforementioned preset correspondence relationship may be that: when the PPPP of the data packet to be sent which is included in the target service related information is a high priority, the target resource configuration information corresponding to the target service related information is resource configuration information 1, and the probability of reserving resources for sending the data packet, which is included in the resource configuration information 1, is 0.5. If the terminal device determines that the probability of sending the data packet is 0.6, e.g. according to the PPPP and the QCI value in combination which are included in the target service related information, since 0.6 is greater than 0.5, the terminal device directly sends the data packet. Alternatively, if the terminal device determines that the probability of sending the data packet is 0.3, e.g. according to the PPPP and the QCI value in combination which are included in the target service related information, since 0.3 is less than 0.5, the terminal device reserves resources for sending the data packet. When the reserved resources are available, the terminal device sends the data packet on the reserved resources.

Alternatively, the aforementioned preset correspondence relationship may be that: when the PPPP of the data packet to be sent which is included in the target service related information is a medium priority, the target resource configuration information corresponding to the target service related information is resource configuration information 2, and the probability of sending the data packet, which is included in the resource configuration information 2, is 0.4. If the terminal device determines that the probability of sending the data packet is 0.2, e.g. according to the PPPP and the QCI value in combination which are included in the target service related information, since 0.2 is less than 0.4, the terminal device does not send the data packet, but reserves resources for sending the data packet. When the reserved resources are available, the terminal device sends the data packet. Alternatively, if the terminal device determines that the probability of sending the data packet is 0.5 according to the PPPP and the QCI value in combination which are included in the target service related information, since 0.5 is greater than 0.4, the terminal device sends the data packet directly via resources in a transmitting resource pool.

Alternatively, the aforementioned preset correspondence relationship is that: when the PPPP of the data packet to be sent which is included in the target service related information is a low priority, the target resource configuration information corresponding to the target service related information is resource configuration information 3, and the time delay of sending the data packet, which is included in the resource configuration information 3, is 2 time units. The terminal device sends the data packet after 2 time units from the time point when the terminal device determines the target resource configuration information corresponding to the data packet to be sent.

Alternatively, the aforementioned preset correspondence relationship is that: when the PPPP of the data packet to be sent which is included in the target service related information is a high priority, the processing mode of the data packet to be sent corresponding to the target service related information is sending, and the resource configuration information corresponding to the sending includes the resource configuration information 1 and resource configuration information 2. Therefore, the terminal device may select the resource configuration information 1 as the target resource configuration information, or select the resource configuration information 2 as the target resource configuration information.

In an implementation of the present disclosure, optionally, in a process of transmitting a current data packet to be sent, the terminal device may reserve resources for transmitting a subsequent data packet to be sent according to indication of the target resource configuration information.

Optionally, as an example, the terminal device may reserve time-frequency resources on multiple consecutive time units, or the terminal device may reserve time-frequency resources on multiple time units in periodical way or in aperiodical way.

Optionally, as illustrated in FIG. 2, before S110, the method 100 further includes an act S130.

In S130, the terminal device determines to work in at least one of the following states: a state of being in a communication mode with a direct interface and controlled by the terminal device, a state of being not connected with a network, and a state of being not within a network coverage.

As the terminal device cannot perform congestion control via a network when working in a state of S130, by adopting the method 100 for data transmission, the terminal device is capable of performing sending adjustment according to a preset rule, thereby avoiding or alleviating congestion.

Further, before the terminal device acquires the target resource configuration information according to the preset correspondence relationship, the terminal device determines that a transmitting resource pool is in a congestion state.

In other words, before the terminal device acquires the target resource configuration information according to the preset correspondence relationship, the terminal device determines that transmitting resources are limited.

For example, the terminal device may determine whether the transmitting resource pool is in the congestion state or whether the transmitting resources are limited by detecting a success probability of sending data on the transmitting resources in the transmitting resource pool or a probability of conflict occurrence in the data sending. For example, it may be assumed that, when the probability of conflict occurrence in the data sending is equal to or greater than 0.2, the transmitting resource pool is in the congestion state or the transmitting resources are limited. When the terminal device determines the probability of conflict occurrence in the data sending is 0.4, the terminal device determines that the transmitting resource pool is in the congestion state or the transmitting resources are limited. The terminal device adopts a method 100 for data transmission, and performs sending adjustment according to a preset rule, thus congestion can be alleviated.

In the forgoing implementation, optionally, the transmitting resource pool may be resources configured by the network device for the terminal device when the terminal device works in a state of accessing a network. Specifically, the network device may send resource indication information to the terminal device, and the resource indication information indicates information of a resource pool which the terminal device may use.

In an implementation of the present disclosure, optionally, a receiving-side terminal device receives, on all possible transmitting resources, data sent by a sending-side terminal device, or a receiving-side terminal device receives, on specific resources, data sent by a sending-side terminal device. The specific resources herein may be resources configured by the network device when the terminal device works in a state of accessing a network.

It should be understood that in various implementations of the present disclosure, values of sequence numbers of the above-mentioned processes do not indicate an order of execution, and the order of execution of various processes should be determined by their functions and internal logics, and should not constitute any limitation on the execution process of the implementations of the present disclosure.

The method for data transmission according to an implementation of the present disclosure is described in detail above with reference to FIG. 1 and FIG. 2. A terminal device according to an implementation of the present disclosure is described in detail below with reference to FIG. 3. As illustrated in FIG. 3, a terminal device 10 includes a processing module 11 and a transceiver module 12.

The processing module 11 is used for acquiring target resource configuration information, wherein the target resource configuration information corresponds to target service related information determined by the processing module 11.

The transceiver module 12 is used for sending, according to the target resource configuration information, a data packet to be sent that carries the target service.

Therefore, a terminal device according to an implementation of the present disclosure sends the data packet according to the target resource configuration information acquired by the terminal device itself, and congestion during a data transmission process can be alleviated.

In an implementation of the present disclosure, optionally, the processing module 11 is specifically used for acquiring, according to a preset correspondence relationship, the target resource configuration information, wherein the preset correspondence relationship includes a correspondence relationship between service related information and resource configuration information.

In an implementation of the present disclosure, optionally, before the processing module 11 determines the target resource configuration information according to the preset correspondence relationship, the processing module 11 is further used for determining to work in at least one of the following states: a state of being in a communication mode with a direct interface and controlled by the terminal device, a state of being not connected with a network, and a state of being not within a network coverage.

In an implementation of the present disclosure, optionally, before the processing module 11 acquires the target resource configuration information according to the preset correspondence relationship, the processing module 11 is further used for determining that a transmitting resource pool is in a congestion state.

In an implementation of the present disclosure, optionally, the target resource configuration information includes at least one of the following information: a logical channel used for sending the data packet, a probability of reserving resources for sending the data packet a probability of sending the data packet, a time delay of using reserved resources for sending the data packet, and a time delay of sending the data packet.

In an implementation of the present disclosure, optionally, the target service related information includes a parameter related to a quality of service (QoS) of the data packet to be sent.

In an implementation of the present disclosure, optionally, the parameter related to the quality of service (QoS) of the data packet to be sent includes at least one of the following parameters: a ProSe Per-Packet Priority (PPPP) of the data packet to be sent, a QoS Class Identifier (QCI) of the data packet to be sent, and a logical channel number corresponding to the data packet to be sent.

In an implementation of the present disclosure, optionally, the transceiver module 12 is further used for receiving configuration information sent by a network device, wherein the configuration information includes the preset correspondence relationship.

It should be understood that the terminal device 10 herein is embodied in a form of functional modules. The term "module" may refer to an Application Specific Integrated Circuit (ASIC), an electronic circuit, a processor used for executing one or more software or firmware programs (such as a shared processor, a dedicated processor, or a group processor), a memory, a merged logic circuit, and/or other proper components supporting the described functions. In an optional example, a person skilled in the art may understand that the terminal device 10 may be used for executing processes and/or acts in the method 100 in the foregoing method implementation, which will not be repeated here to avoid repetition.

Figure 4:
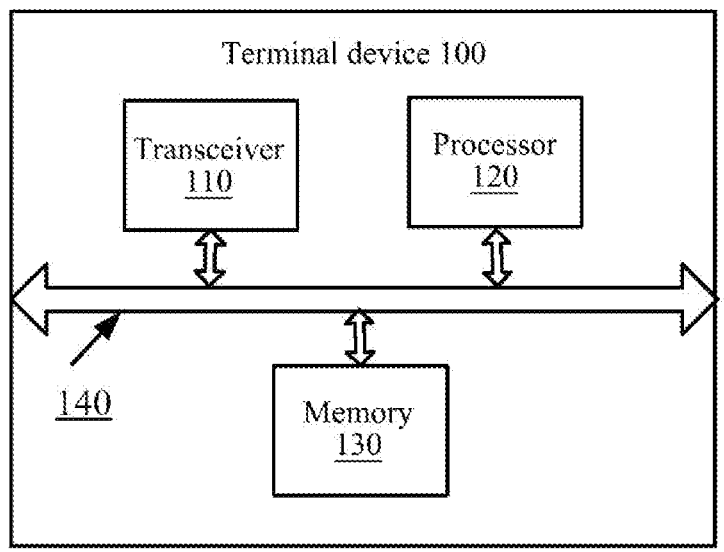
FIG. 4 is a schematic diagram of a terminal device according to another implementation of the present disclosure.

FIG. 4 is a schematic diagram of a terminal device according to another implementation of the present disclosure. A terminal device 100 in FIG. 4 includes a transceiver 110, processor 120, memory 130, and bus system 140. The transceiver 110, processor 120, and memory 130 are connected through the bus system 140. The memory 130 is used for storing instructions. The processor 120 is used for executing the instructions stored in the memory 130 to control the transceiver 110 to send and receive signals. The processor 120 is used for acquiring target resource configuration information, wherein the target resource configuration information corresponds to target service related information determined by the processor 120. The transceiver 110 is used for sending a data packet to be sent according to the target resource configuration information.

Therefore, a terminal device according to an implementation of the present disclosure sends the data packet according to the target resource configuration information acquired by the terminal device itself, and congestion during a data transmission process can be alleviated.

It should be understood that the processor in implementations of the present disclosure may be an integrated circuit chip with a capability for processing signals. The processor may be a general purpose processor, a Digital Signal Processor (DSP), an Application Specific Integrated Circuit (ASIC), a Field Programmable Gate Array (FPGA) or other programmable logic devices, discrete gate or transistor logic devices, and discrete hardware components, which may perform or execute the methods, acts or logical frameworks disclosed in the implementations of the present disclosure. The general purpose processor may be a microprocessor or the processor may be any conventional processor or the like.

It should be understood that the memory in implementations of the present disclosure may be a transitory memory or non-transitory memory, or may include both transitory and non-transitory memory. The non-transitory memory may be Read-Only Memory (ROM), Programmable ROM (PROM), Erasable PROM (EPROM), Electrically EPROM (EEPROM) or flash memory. The transitory memory may be Random Access Memory (RAM) which serves as an external cache. By illustration of example but not restriction, RAM is available in many forms such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that memories in the systems and methods described herein are intended to include, but are not limited to, these and any other suitable types of memories.

The bus system in implementations of the present disclosure includes a data bus, and it may also include a power supply bus, a control bus, a state signal bus, and so on. However, for clarity, all kinds of buses are uniformly referred to as a bus system 140 in the figure.

Optionally, in an implementation, the processor 120 is specifically used for acquiring the target resource configuration information according to a preset correspondence relationship, wherein the preset correspondence relationship includes a correspondence relationship between service related information and resource configuration information.

Optionally, in an implementation, before the processor 120 acquires the target resource configuration information according to the preset correspondence relationship, the processor 120 is further used for determining to work in at least one of the following states: a state of being in a communication mode with a direct interface and controlled by the terminal device, a state of being not connected with a network, and a state of being not within a network coverage.

Optionally, in an implementation, before the processor 120 acquires the target resource configuration information according to the preset correspondence relationship, the processor 120 is further used for determining that a transmitting resource pool is in a congestion state.

Optionally, in an implementation, the target resource configuration information includes at least one of the following information: a logical channel used for sending the data packet, a probability of reserving resources for sending the data packet, a probability of sending the data packet, a time delay of using reserved resources for sending the data packet, and a time delay of sending the data packet.

Optionally, in an implementation, the target service related information includes a parameter related to a quality of service (QoS) of the data packet to be sent.

Optionally, in an implementation, the parameter related to the quality of service (QoS) of the data packet to be sent includes at least one of the following parameters: a ProSe Per-Packet Priority (PPPP) of the data packet to be sent, a QoS Class Identifier (QCI) of the data packet to be sent, and a logical channel number corresponding to the data packet to be sent.

Optionally, in an implementation, the transceiver 110 is further used for receiving configuration information sent by a network device, wherein the configuration information includes the preset correspondence relationship.

Optionally, in an execution process, acts of the above-mentioned method may be accomplished by integrated logic circuits of hardware in the processor 120 or instructions in the form of software. The acts of the method disclosed in connection with the implementations of the present disclosure may be directly embodied in the execution of a hardware decoding processor or in the execution in the combination of hardware and software modules in the decoding processor. Software modules may be located in typical storage media in the art such as RAM, flash memory, read-only memory, programmable read-only memory, electrical erasable programmable memory, or registers. The storage medium is located in the memory. The processor reads the information in the memory and accomplishes the acts of the above-mentioned method with its hardware.

Those of ordinary skill in the art will recognize that the exemplary elements and algorithm acts described in connection with the implementations disclosed herein can be realized in electronic hardware, or a combination of computer software and electronic hardware. Whether these functions are performed in hardware or software depends on the specific application and design constraints of the technical solution. Skilled in the art may use different methods to realize the described functions for each particular application, but such realization should not be considered to be beyond the scope of the present disclosure.

Those skilled in the art can clearly understand that for convenience and conciseness of description, corresponding processes in the aforementioned method implementations may be referred to for the specific working processes of the system, device, and unit described above, which are not repeated here.

In several implementations provided by the present application, it should be understood that the disclosed system, apparatus and method may be realized in other ways. For example, the apparatus implementations described above are only illustrative, for example, the division of the units is only a logical function division, and there may be other division manners in actual realization. For example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be electrical, mechanical or in other forms.

The unit described as a separate unit may or may not be physically separated, and the unit shown as a unit may or may not be a physical unit, i.e., may be located in one place or may be distributed over multiple network units. Some or all of the elements can be selected according to actual needs to achieve the purpose of the implementation of the present disclosure.

In addition, various functional units in various implementations of the present disclosure may be integrated in one processing unit, or various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the related art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure. The aforementioned storage media include U disk, mobile hard disk, read-only memory (ROM), random access memory (RAM), magnetic disk or optical disk, and other media capable of storing program codes.

What are described above are merely exemplary implementations of the present disclosure, but the protection scope of the present disclosure is not limited thereto. Any person skilled in the art may easily conceive changes or substitutions within the technical scope disclosed by the present disclosure, which should be included within the protection scope of the present disclosure. Therefore, the protection scope of the present disclosure should be subject to the protection scope of the claims.

I claim:

1. A method for data transmission, comprising:
acquiring, by a terminal device, target resource configuration information, wherein the target resource configuration information corresponds to target service related information transmitted by the terminal device, wherein the target service related information comprises a ProSe Per-Packet Priority (PPPP) of the data packet to be sent, and a QoS Class Identifier (QCI) of the data packet to be sent;
sending, by the terminal device, according to the target resource configuration information, a data packet related to the target service, wherein the target resource configuration information comprises a probability of reserving resources for sending the data packet;
determining, by the terminal device, a probability of sending the data packet according to the PPPP and the QCI, and comparing the probability of reserving resources for sending the data packet with the determined probability of sending the data packet;
when the determined probability of sending the data packet is greater than the probability of reserving resources for sending the data packet, directly sending, by the terminal device, the data packet; and
when the determined probability of sending the data packet is less than the probability of reserving resources for sending the data packet, reserving, by the terminal device, resources for sending the data packet, and sending, by the terminal device, the data packet on the reserved resources when the reserved resources are available.

2. The method of claim 1, wherein acquiring, by the terminal device, the target resource configuration information, comprises:
acquiring, by the terminal device, the target resource configuration information according to a preset correspondence relationship, wherein the preset correspondence relationship comprises a correspondence relationship between service related information and resource configuration information.

3. The method of claim 2, wherein before the terminal device acquires the target resource configuration information according to the preset correspondence relationship,
the terminal device is working in at least one of the following states: a state of being in a communication mode with a direct interface and controlled by the terminal device, a state of being not connected with a network, and a state of being not within a network coverage.

4. The method of claim 2, wherein before the terminal device acquires the target resource configuration information according to the preset correspondence relationship, the method further comprises:
determining, by the terminal device, that a transmitting resource pool is in a congestion state.

5. The method of claim 2, further comprising:
receiving, by the terminal device, configuration information sent by a network device, wherein the configuration information comprises the preset correspondence relationship.

6. A terminal device comprising:
a processor, used for acquiring target resource configuration information, wherein the target resource configuration information corresponds to target service related information transmitted by the terminal device, wherein the target service related information comprises a ProSe Per-Packet Priority (PPPP) of the data packet to be sent and a QoS Class Identifier (QCI) of the data packet to be sent; and
a transceiver, used for sending, according to the target resource configuration information, a data packet related to the target service, wherein the target resource configuration information comprises a probability of reserving resources for sending the data packet; and
the processor is further used for determining a probability of sending the data packet according to the PPPP and the QCI, and for comparing the probability of reserving resources for sending the data packet with the determined probability of sending the data packet,
wherein when the determined probability of sending the data packet is greater than the probability of reserving resources for sending the data packet, the data packet is directly sent, and
wherein when the determined probability of sending the data packet is less than the probability of reserving resources for sending the data packet, reserving resources for sending the data packet and sending the data packet on the reserved resources when the reserved resources are available.

7. The terminal device of claim 6, wherein the processor is specifically used for:
acquiring the target resource configuration information according to a preset correspondence relationship, wherein the preset correspondence relationship comprises a correspondence relationship between service related information and resource configuration information.

8. The terminal device of claim 7, wherein before the processor acquires the target resource configuration information according to the preset correspondence relationship, the processor is further used for:
working in at least one of the following states: a state of being in a communication mode with a direct interface and controlled by the terminal device, a state of being not connected with a network, and a state of being not within a network coverage.

9. The terminal device of claim 7, wherein before the processor acquires the target resource configuration information according to the preset correspondence relationship, the processor is further used for:
determining that a transmitting resource pool is in a congestion state.

10. The terminal device of claim 7, wherein the transceiver is further used for:
receiving configuration information sent by a network device, wherein the configuration information comprises the preset correspondence relationship.

11. The method of claim 3, wherein before the terminal device acquires the target resource configuration information according to the preset correspondence relationship, the method further comprises:
determining, by the terminal device, that a transmitting resource pool is in a congestion state.

12. A non-transitory computer readable storage medium, comprising a computer program that is executable by a terminal device to perform acts of:
acquiring target resource configuration information, wherein the target resource configuration information corresponds to target service related information transmitted by the terminal device, the target service related information comprises a ProSe Per-Packet Priority (PPPP) of the data packet to be sent, and a QoS Class Identifier (QCI) of the data packet to be sent;

sending according to the target resource configuration information, a data packet related to the target service, wherein the target resource configuration information comprises a probability of reserving resources for sending the data packet;

determining, by the terminal device, a probability of sending the data packet according to the PPPP and the QCI, and comparing the probability of reserving resources for sending the data packet with the determined probability of sending the data packet;

when the determined probability of sending the data packet is greater than the probability of reserving resources for sending the data packet, directly sending, by the terminal device, the data packet; and when the determined probability of sending the data packet is less than the probability of reserving resources for sending the data packet, reserving, by the terminal device, resources for sending the data packet, and sending, by the terminal device, the data packet on the reserved resources when the reserved resources are available.

\* \* \* \* \*